United States Patent
Izumi

(10) Patent No.: US 7,408,438 B2
(45) Date of Patent: Aug. 5, 2008

(54) COMMUNICATION APPARATUS HAVING WIRED COMMUNICATION FUNCTION AND WIRELESS COMMUNICATION FUNCTION, AND CONTROL METHOD THEREFOR

(75) Inventor: Michihiro Izumi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 235 days.

(21) Appl. No.: 11/124,235

(22) Filed: May 9, 2005

(65) Prior Publication Data
US 2005/0197072 A1 Sep. 8, 2005

Related U.S. Application Data

(62) Division of application No. 09/736,341, filed on Dec. 15, 2000, now Pat. No. 7,061,365.

(30) Foreign Application Priority Data
Dec. 20, 1999 (JP) ............... 1999-360343

(51) Int. Cl.
G06F 9/32 (2006.01)
H03K 17/00 (2006.01)
G05B 23/02 (2006.01)

(52) U.S. Cl. ............... 340/2.1; 340/2.7; 340/3.1

(58) Field of Classification Search ............... 340/2.1, 340/2.23, 2.7, 3.1, 3.63, 539; 455/7.39, 7.4, 455/3.1; 370/350, 338
See application file for complete search history.

(56) References Cited

U.S. PATENT DOCUMENTS

| | | | |
|---|---|---|---|
| 4,752,949 A | 6/1988 | Steinbeck et al. | 379/61 |
| 4,837,812 A | 6/1989 | Takahashi et al. | 379/98 |
| 5,134,644 A * | 7/1992 | Garton et al. | 379/39 |
| 5,428,636 A | 6/1995 | Meier | 375/202 |
| 5,479,485 A | 12/1995 | Hayashi | 379/61 |
| 5,497,373 A | 3/1996 | Hulen et al. | 370/79 |
| 5,517,552 A | 5/1996 | Yamashita | 379/58 |
| 5,519,763 A * | 5/1996 | Namekawa et al. | 455/556.1 |
| 5,537,220 A | 7/1996 | Ezumi et al. | 358/442 |
| 5,608,545 A * | 3/1997 | Kagawa | 358/468 |
| 5,684,608 A | 11/1997 | Charbonnier et al. | 358/442 |
| 5,726,984 A | 3/1998 | Kubler et al. | 370/349 |
| 5,802,471 A | 9/1998 | Sawai et al. | 455/445 |
| 5,909,432 A * | 6/1999 | Arends et al. | 370/261 |
| 5,910,815 A | 6/1999 | Boursier et al. | 348/14 |
| 5,982,854 A | 11/1999 | Ehreth | 379/56.2 |
| 6,072,803 A | 6/2000 | Allmond et al. | 370/445 |
| 6,091,968 A | 7/2000 | Koohgoli et al. | 455/557 |
| 6,122,508 A | 9/2000 | Veloso | 455/433 |
| 6,128,510 A | 10/2000 | Beukema et al. | 455/557 |
| 6,131,136 A | 10/2000 | Liebenow et al. | 710/131 |
| 6,223,061 B1 | 4/2001 | Dacus et al. | 455/574 |

FOREIGN PATENT DOCUMENTS

EP 0 957 627 A2 11/1999
JP 2000-174922 A 6/2000

* cited by examiner

Primary Examiner—Brian Zimmerman
Assistant Examiner—Nam V Nguyen
(74) Attorney, Agent, or Firm—Fitzpatrick, Cella, Harper & Scinto

(57) ABSTRACT

A communication apparatus automatically sets the most appropriate communication mode in accordance with the location at which the communication apparatus is used. For example, the communication mode is switched between operating as a master station and operating as a remote station of a wireless communication system depending on whether or not connection is made to a wired communication line.

11 Claims, 10 Drawing Sheets

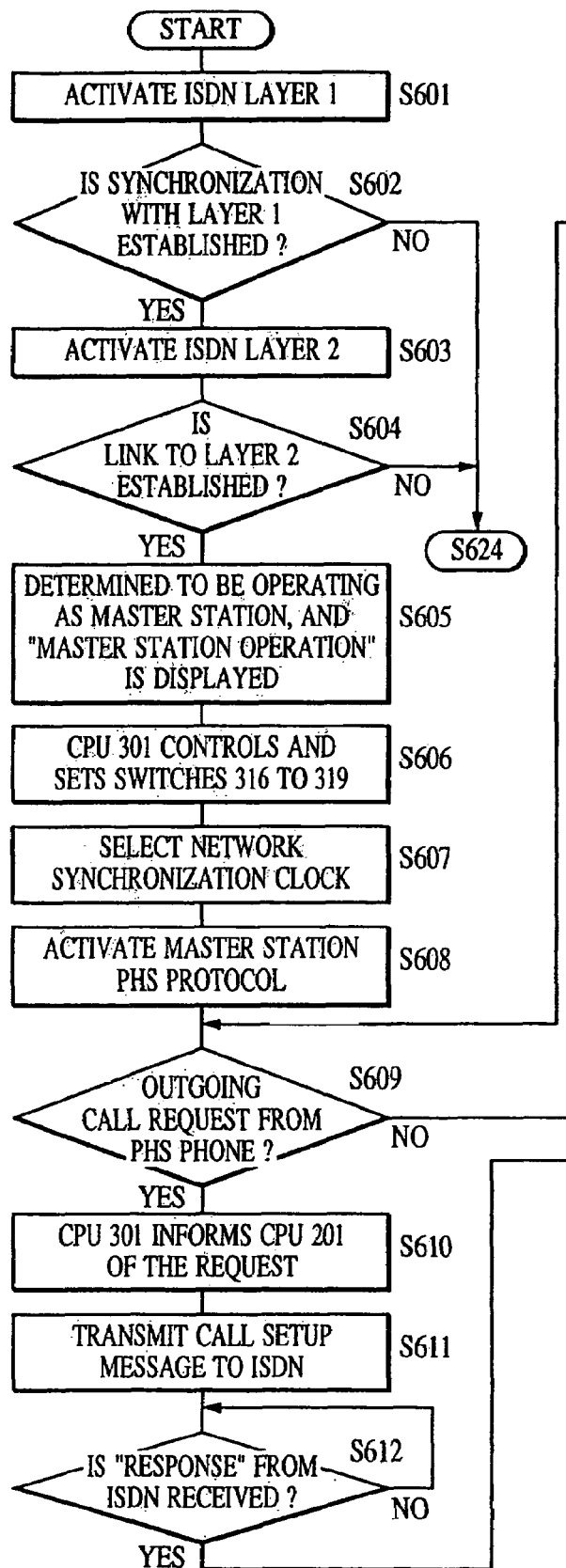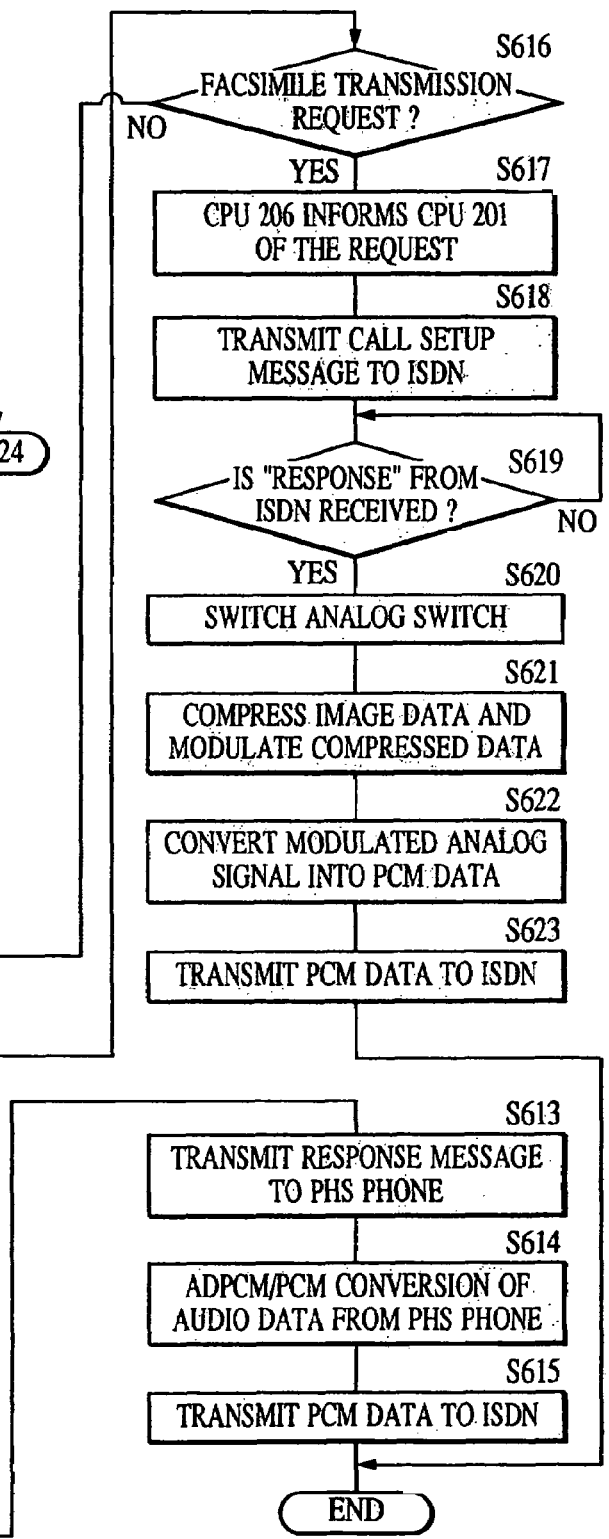
FIG. 9

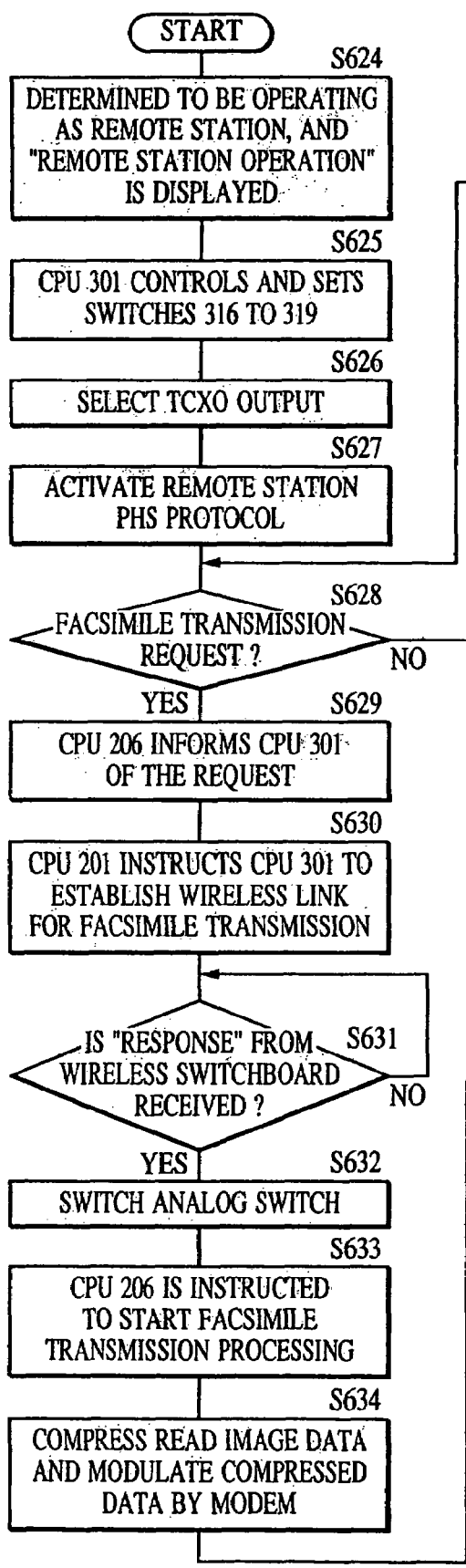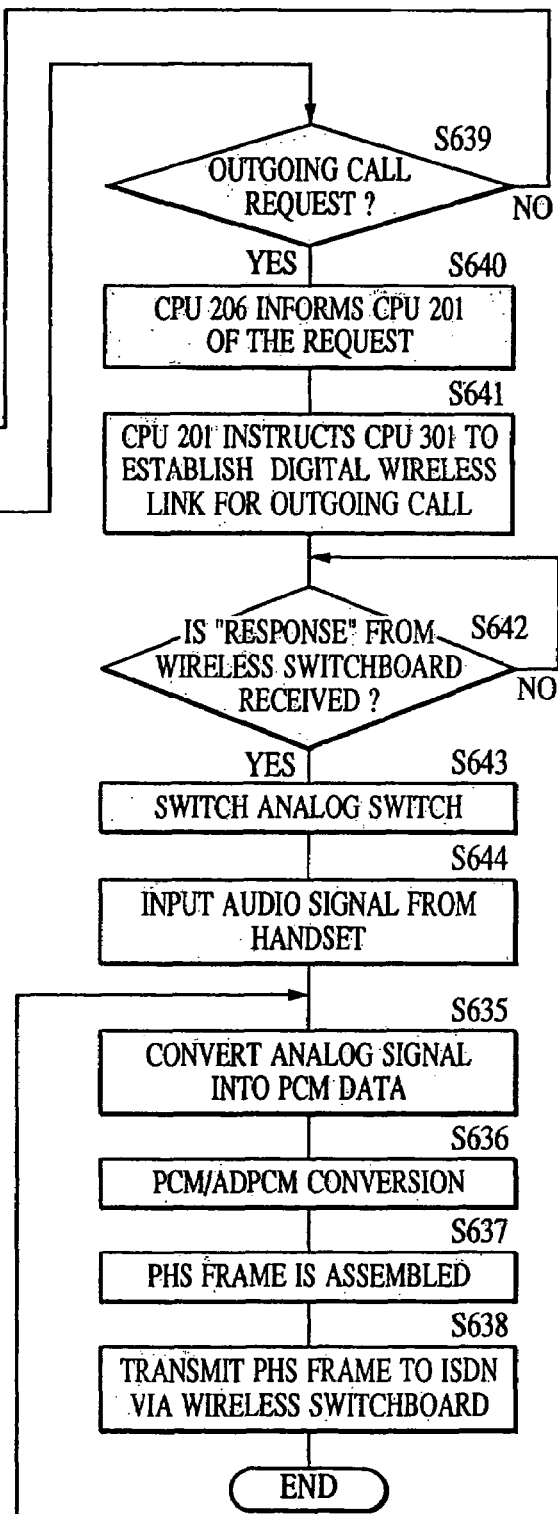
FIG. 10

COMMUNICATION APPARATUS HAVING WIRED COMMUNICATION FUNCTION AND WIRELESS COMMUNICATION FUNCTION, AND CONTROL METHOD THEREFOR

RELATED APPLICATION

This application is a division of U.S. application Ser. No. 09/736,341, filed Dec. 15, 2000, the entire content of which is hereby incorporated herein by reference.

BACKGROUND OF THE INVENTION

1. Field of the Invention

The present invention relates to communication apparatuses having a wired communication function and a wireless communication function, and to control methods therefor.

2. Description of the Related Art

Recently, wireless switching systems for establishing a wireless link between a facsimile apparatus and a wireless switchboard have been installed as local communication systems in offices and the like.

When only wireless links are established at locations in which such wireless switching systems are used, it is not possible to use facsimile apparatuses which cannot perform wireless communication.

Japanese Patent Laid-Open No. 2000-174922 describes a communication apparatus having a wireless communication function and a wired communication function, in which switching between the wireless communication function and the wired communication function is performed by manual setting by a user.

When moving the above communication apparatus from a place in which only wired connections are used to a place in which only wireless links are used, the user is required to change the setting from a wired communication mode to a wireless communication mode.

It is also necessary to provide hardware such as a communication mode setting switch.

When moving the above communication apparatus from a place in which only wireless links are used to a place in which only wired connections are used, the user is required to change the setting of the communication mode.

SUMMARY OF THE INVENTION

Accordingly, it is an object of the present invention to enable a communication apparatus to perform communication in accordance with the environment in which the communication apparatus is installed.

Another object of the present invention is to automatically switch between wireless communication and wired communication in accordance with the environment in which the communication apparatus is installed.

According to an aspect of the present invention, a communication apparatus having a wired communication function and a wireless communication function is provided that includes a determining unit for determining whether connection is made to a wired communication line, and a control unit for selectively controlling, in accordance with the determination by the determining unit, whether to transmit data from the communication apparatus through one of the wired communication line and a wireless communication link.

According to another aspect of the present invention, a communication apparatus having a first mode for performing wireless communication under the control of a first wireless communication apparatus and a second mode for controlling so that a second wireless communication apparatus performs wireless communication is provided. The communication apparatus includes a determining unit for determining whether connection is made to a wired communication liners and a control unit for controlling, in accordance with the determination by the determining unit, so as to switch between the first mode and the second mode.

According to a further aspect of the present invention, a method for controlling a communication apparatus having a wired communication function and a wireless communication function is provided that includes a determining step of determining whether connection is made to a wired communication line. The method includes a control step of selectively controlling, in accordance with the determination in the determining step, whether to transmit data from the communication apparatus through one of the wired communication line and a wireless communication link.

According to yet a further aspect of the present invention, a method for controlling a communication apparatus having a first mode for performing wireless communication under the control of a first wireless communication apparatus and a second mode for controlling so that a second wireless communication apparatus performs wireless communication is provided. The method includes a determining step of determining whether connection is made to a wired communication line, and a control step of controlling, in accordance with the determination in the determining step, so as to switch between the first mode and the second mode.

Further objects, features, and advantages of the present invention will be apparent from the following description of the preferred embodiments with reference to the attached drawings.

BRIEF DESCRIPTION OF THE DRAWINGS

FIG. 9 is a flowchart showing a process for controlling the facsimile apparatus FS1 of the present embodiment; and FIG. 10 is a flowchart showing a process for controlling the facsimile apparatus FS1 of the present embodiment.

DESCRIPTION OF THE PREFERRED EMBODIMENTS

First Embodiment

Figure 1A:
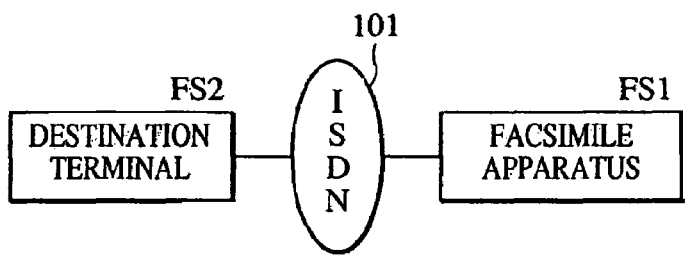
FIGS. 1A to 1C are respectively block diagrams of the structures of communication systems CS1, CS2, and CS3, which include a facsimile apparatus FS1 according to an embodiment of the present invention.
Figure 1B:
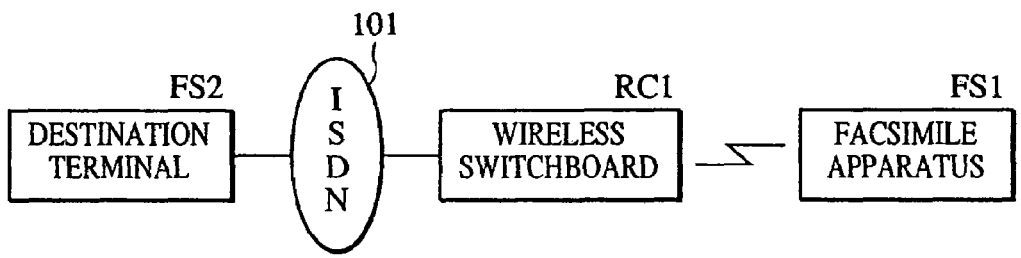
Figure 1C:
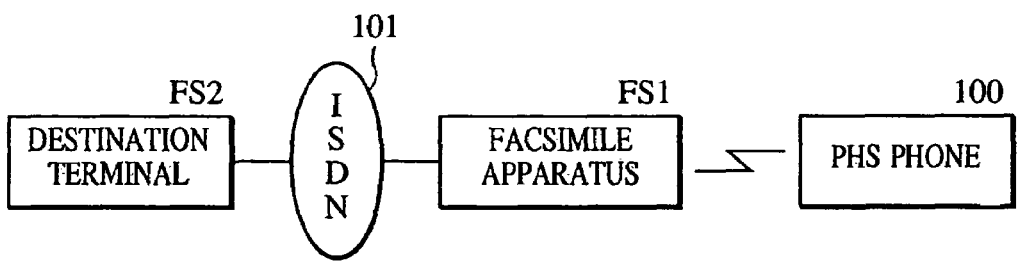

FIGS. 1A to 1C respectively show the structures of communication systems CS1, CS2, and CS3, which include a facsimile apparatus FS1 according to a first embodiment of the present invention.

FIG. 1A shows the structure of the communication system CS1 in which the facsimile apparatus FS1 is connected to an integrated service digital network (ISDN) 101. In the communication system CS1, the facsimile apparatus FS1 is also connected to a destination terminal FS2 through the ISDN 101.

FIG. 1B shows the structure of the communication system CS2 in which the facsimile apparatus FS1 is not connected to the ISDN 101.

The communication system CS2 includes the facsimile apparatus FS1 and a wireless switchboard RC1. The ISDN 101 and the wireless switchboard RC1 are interconnected, and the ISDN 101 and the destination terminal FS2 are interconnected. A digital wireless link is established between the facsimile apparatus FS1 and the wireless switchboard RC1. In this case, the facsimile apparatus FS1 functions as a remote station of the wireless switchboard RC1. The wireless switchboard RC1 is an example of a second communication apparatus connected to a wired communication line.

FIG. 1C shows the structure of the communication system CS3 in which the facsimile apparatus FS1 is connected to the ISDN 101.

The communication system CS3 includes the facsimile apparatus FS1 and a Personal Handyphone System (PHS) 100, which is an example of a digital cordless phone. The facsimile apparatus FS1 is connected to the destination terminal FS2 through the ISDN 101. In this case, the facsimile apparatus FS1 functions as a master station of the PHS 100.

The PHS 100 transmits and receives data to and from the facsimile apparatus FS1 through a digital wireless link. The PHS 100, which is a remote station wireless terminal unit, is connected to the ISDN 101 through the facsimile apparatus FS1.

Figure 2:
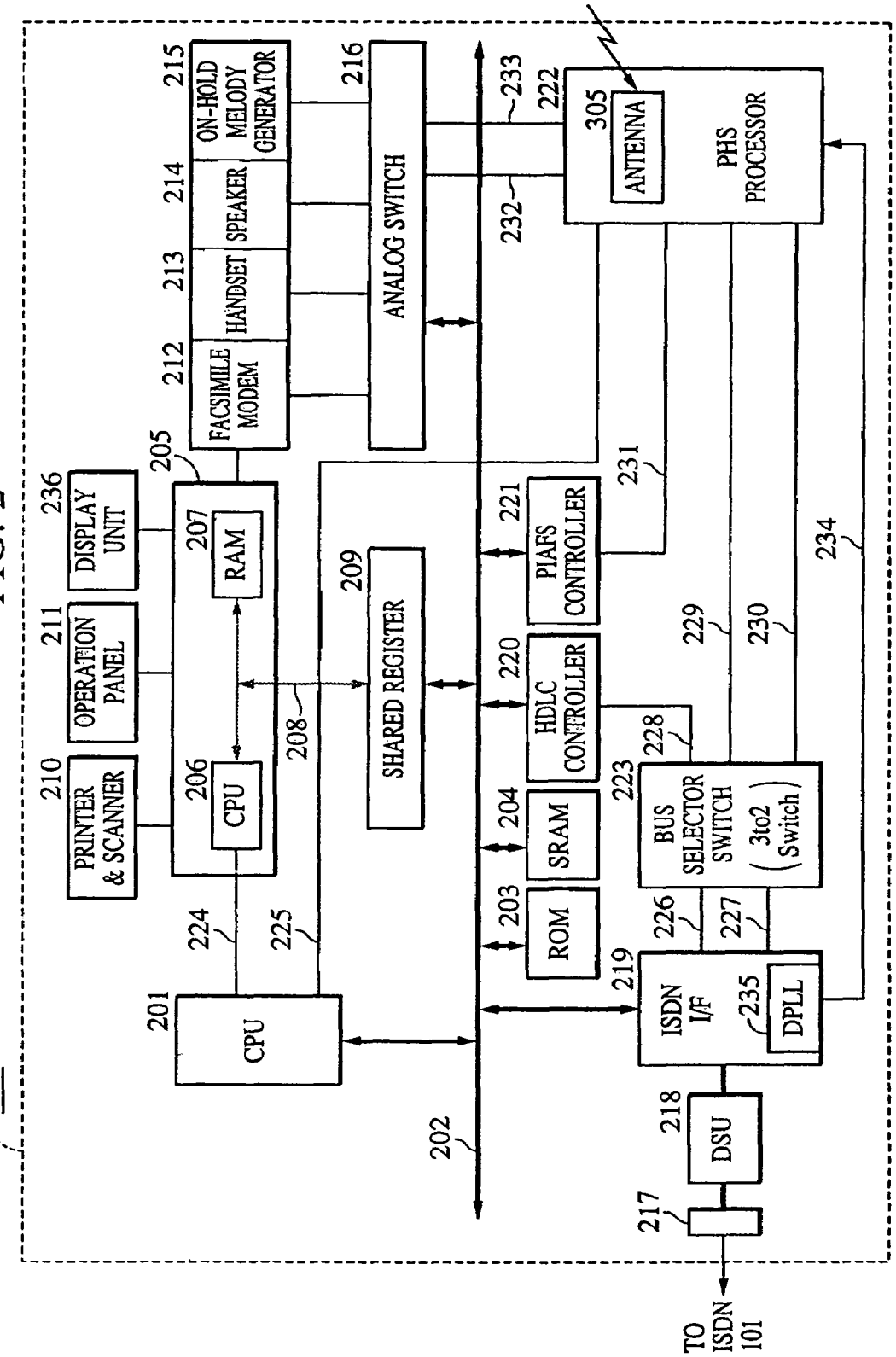
FIG. 2 is a block diagram of the structure of the facsimile apparatus FS1 of the present embodiment.

FIG. 2 shows the structure of the facsimile apparatus FS1 of the first embodiment of the present invention.

The facsimile apparatus FS1 includes a central processing unit (CPU) 201, a data bus/address bus 202, a read only memory (ROM) 203, a random access memory (RAM) 204, and a facsimile engine controller 205.

The CPU 201 controls the entire facsimile apparatus FS1 in accordance with a program stored in the ROM 203.

The facsimile engine controller 205 includes a CPU (microcomputer) 206 that performs various controlling operations in accordance with a program stored in a ROM (not shown) and a RAM 207. The facsimile engine controller 205 is connected to a data bus 208.

The facsimile apparatus FS1 includes a shared register 209 that communicates data between a system at the CPU 201 side and a system at the CPU 206 side, a color printer/color scanner 210, an operation panel 211, a facsimile modem 212, a handset 213, a speaker 214, an on-hold melody generator 215, and a display unit 236.

The shared register 209, the color printer/color scanner 210, the operation panel 211, the facsimile modem 212, the handset 213, the speaker 214, the on-hold melody generator 215, and the display unit 236 are controlled by the facsimile engine controller 205 and are connected to an analog switch 216. Audio data or facsimile analog data is connected to the ISDN 101 through the analog switch 216.

The facsimile apparatus FS1 further includes a modular connector 217, a digital service unit (DSU) 218, an ISDN interface part 219, a high-level data link control (HDLC) controller 220, a PHS Internet Access Forum Standard (PI-AFS) controller (wireless data communication protocol processor) 221, a PHS processor 222, and a bus selector switch 223.

The modular connector 217 interconnects the facsimile apparatus FS1 and the ISDN 101 (U-point).

The DSU 218 converts data communicated between a station switchboard of the ISDN 101 and the facsimile apparatus FS1 into a signal at a transistor-transistor logic (TTL) level.

The ISDN interface part 219 controls layers 1 to 3 of the ISDN 101 and has a function for inputting/outputting data on the B-channels of the ISDN 101. The ISDN interface part 219 includes a digital phase locked loop (PLL) 235. The digital PLL 235 has a function for generating an 8 KHz clock in synchronism with data received from the ISDN 101.

The HDLC controller 220 assembles/decomposes data in an HDLC format.

The PIAFS controller 221 assembles/decomposes frames in a wireless data communication protocol format.

The PHS processor 222 performs PHS wireless communication protocol processing, pulse code modulation (PCM) code conversion, and the like.

Under the control of the CPU 201, the bus selector switch 223 has a function for connecting data, which is transmitted on B1 channel and B2 channel of the ISDN 101, to either the HDLC controller 220 or the PHS processor 222.

Major signal lines included in the facsimile apparatus FS1 of the first embodiment are described next.

A signal line 224 is a serial communication signal line that communicates a control signal between the CPU 201 and the CPU 206. A signal line 225 is a serial communication signal line that communicates a control signal between the CPU 201 and the PHS processor 222.

A signal line 226 is a 64-Kbps serial transmission signal line for B1 channel of the ISDN 101, and a signal line 227 is a 64-Kbps serial transmission signal line for B2 channel of the ISDN 101.

A signal line 228 is a serial communication signal line input to and output from the HDLC controller 220 and transmits data in the HDLC frame format.

Signal lines 229 and 230 are serial communication signal lines which are input to and output from the PHS processor 222 at a line speed of 64 Kbps. The signal lines 229 and 230 are signals that transmit data obtained by converting a 32-Kbps signal transmitted through a digital wireless link into 64-Kbps data or data obtained by converting an analog signal input from the analog switch 216 into 64-Kbps PCM data. When outputting data from the PHS 100 to the ISDN 101, the data undergoes speed conversion (I.460) from 32 Kbps to 64 Kbps by the PHS processor 222, and the converted data is output to the signal lines 229 and 230.

A signal line 231 outputs a 32 Kbps signal received from the PHS processor 222 through a digital wireless link as it is. The signal line 231 is connected to the PIAFS controller 221.

Signal lines 232 and 233 connect analog signals input to and output from the analog switch 216 to PCM codecs 310 and 311 (see FIG. 3) in the PHS processor 222.

A signal line 234 transfers the 8 KHz clock, which is extracted from the ISDN 101 by the digital PLL 235 in the ISDN interface part 219, to the PHS processor 222.

Figure 3:
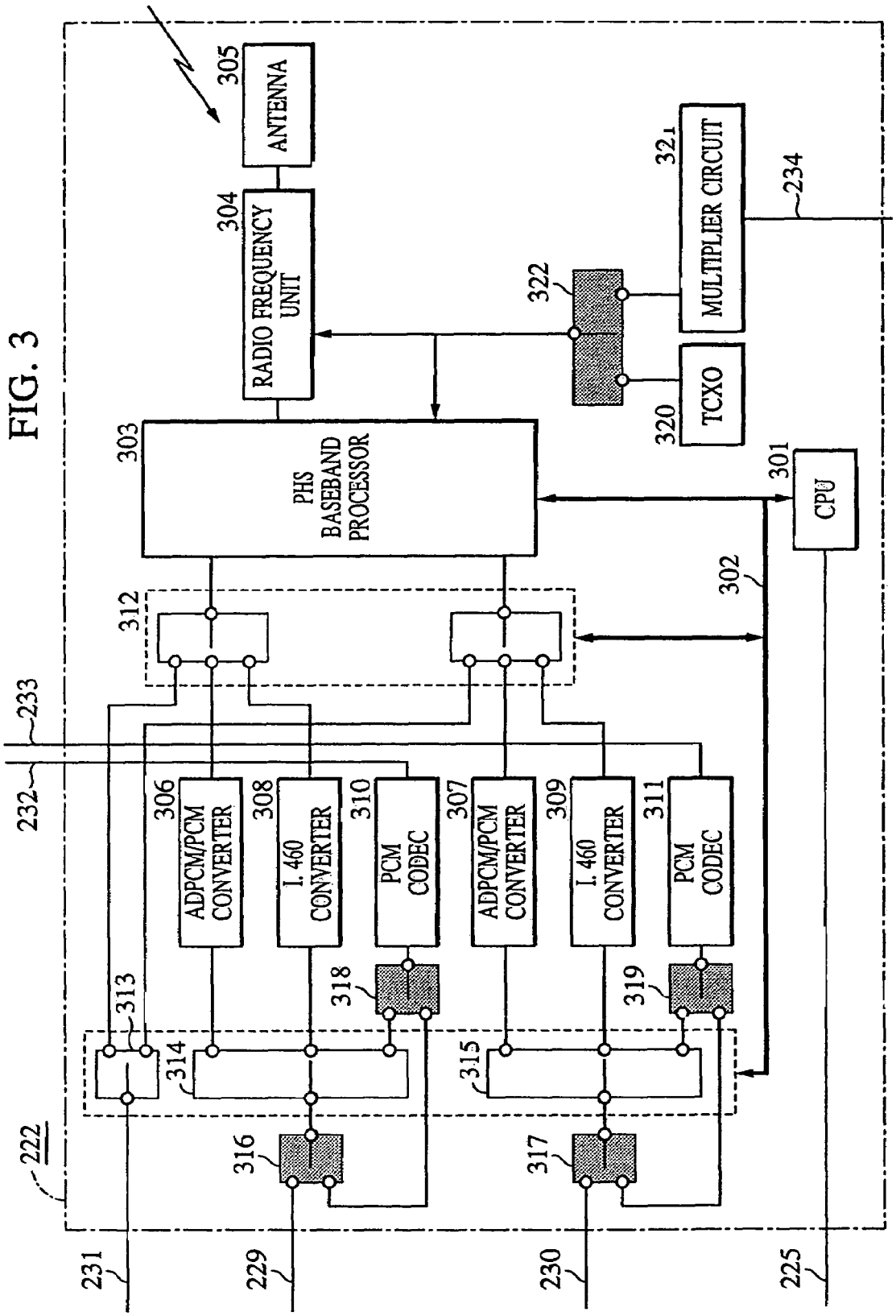
FIG. 3 is a block diagram of the internal structure of a Personal Handyphone System (PHS) processor 222 included in the facsimile apparatus FS1 of the present embodiment.

FIG. 3 shows the internal structure of the PHS processor 222 included in the facsimile apparatus FS1 of the first embodiment.

A CPU 301 includes a RAM (not shown) and a ROM (not shown) and performs control operations related to the PHS 100. The CPU 301 is connected to a data bus 302. The CPU 301 performs various control operations described below in accordance with a program stored in its ROM.

A PHS baseband processor 303 assembles and decomposes PHS transmission frames. The PHS baseband processor 303 is capable of processing two slots in a PHS transmission frame.

A radio frequency unit 304 performs frequency conversion of data to be transferred so that the data is transferred at 1.9 GHz band. The radio frequency unit 304 connected to an antenna 305.

Adaptive differential pulse code modulation (ADPCM)/PCM converters 306 and 307 convert ADPCM-coded audio data at 32 Kbps, which is used in PHS wireless transmission, into PCM-coded audio data at 64 Kbps, which is used by the ISDN 101. The ADPCM/PCM converters 306 and 307 convert PCM coded audio data at 64 Kbps, into ADPCM-coded audio data at 32 Kbps.

I.460 converters 308 and 309 perform speed conversion of 32-Kbps data into 64-Kbps data in order to transmit data, which is transferred using the PHS wireless transmission, to the ISDN 101.

The PCM codecs 310 and 311 converts analog signals input from the analog switch 216 through the signal lines 232 and 233 into PCM-coded data at 64 Kbps.

A switch 312 switches 32-Kbps data output from the PHS baseband processor 303.

A switch 313 connects either of 32-Kbps data on two channels, which are output from the PHS baseband processor 303, to the PIAFS controller 221.

Switches 314 and 315 switch data to be connected to the signal lines 229 and 230, which are 64-Kbps transmission lines.

Switches 316 and 317 switch between whether to connect data, which is received from the digital wireless link and is PCM-converted, to a bus for transmitting to the ISDN 101 or to a bus for in putting to the PCM codecs 310 and 311 that perform analog conversion.

Switches 318 and 319 switch data received from the ISDN 101 or data received from the digital wireless link to be connected to the PCM codecs 310 and 311.

The switches 312 to 319 are controlled by the CPU 301. The facsimile apparatus FS1 can function both as a master station of the PHS 100 and as a remote station of the wireless switchboard RC1 by means of the switches 316 to 319.

A temperature compensated crystal oscillator (TCXO) 320 generates a 19.2 MHz clock with an accuracy of ±3 ppm irrespective of the temperature. The PHS baseband processor 303 and the radio frequency unit 304 operate based on the clock.

A multiplier circuit 321 generates a 19.2 MHz clock in synchronism with the 8 KHz clock output from the ISDN interface part 219.

Under the control of the CPU 301, a clock selecting switch 322 selects between the clock generated by the TCXO 320 and the clock generated by the multiplier circuit 321 in synchronism with the ISDN 101.

Figure 4:
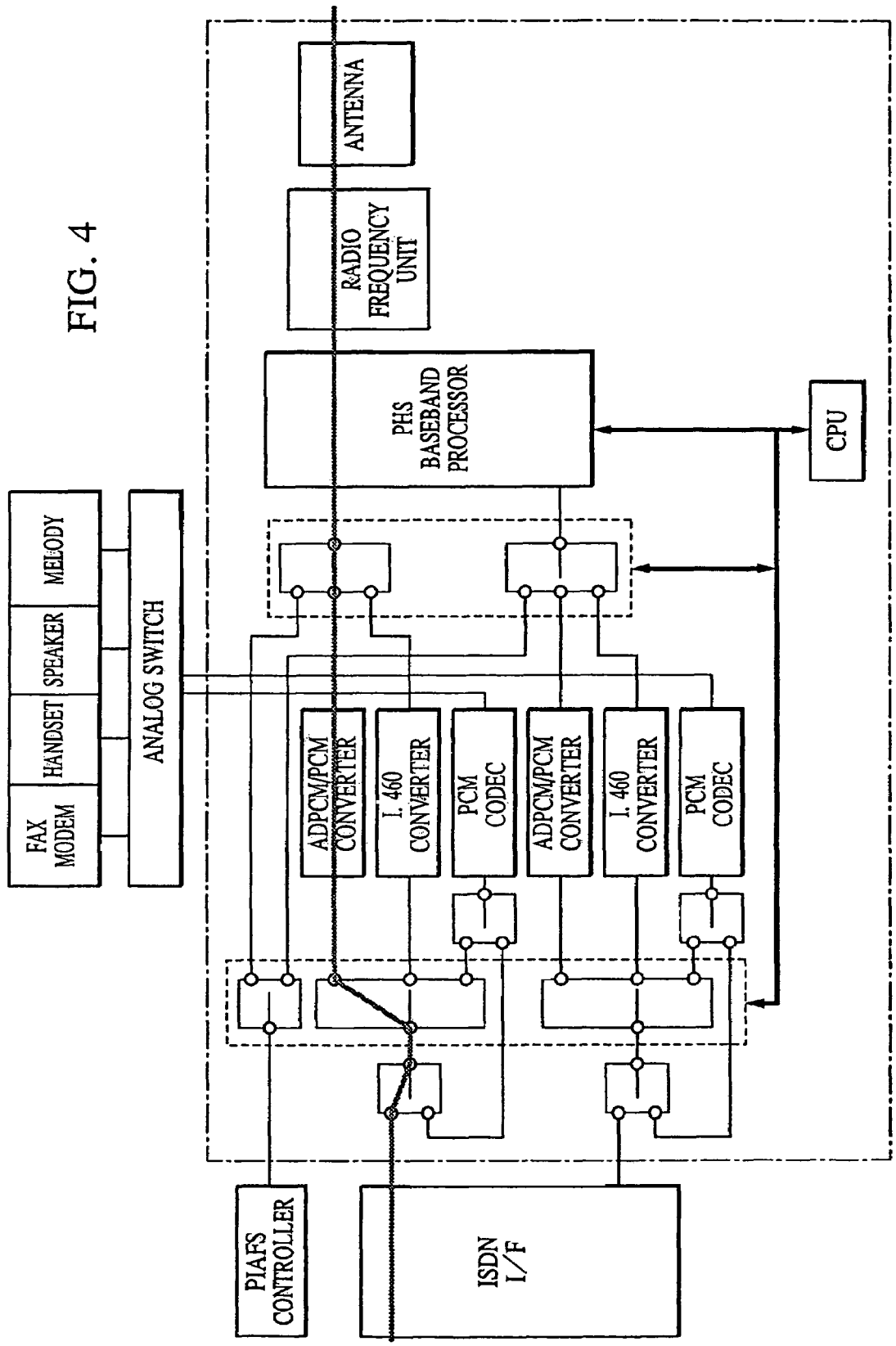
FIG. 4 is a flowchart showing a process for making a call from a PHS 100 when the facsimile apparatus FS1 of the present embodiment is connected to an integrated services digital network (ISDN) 101.

FIG. 4 shows a data stream when making a call from the PHS 100 while the facsimile apparatus FS1 of the first embodiment is connected to the ISDN 101.

Figure 5:
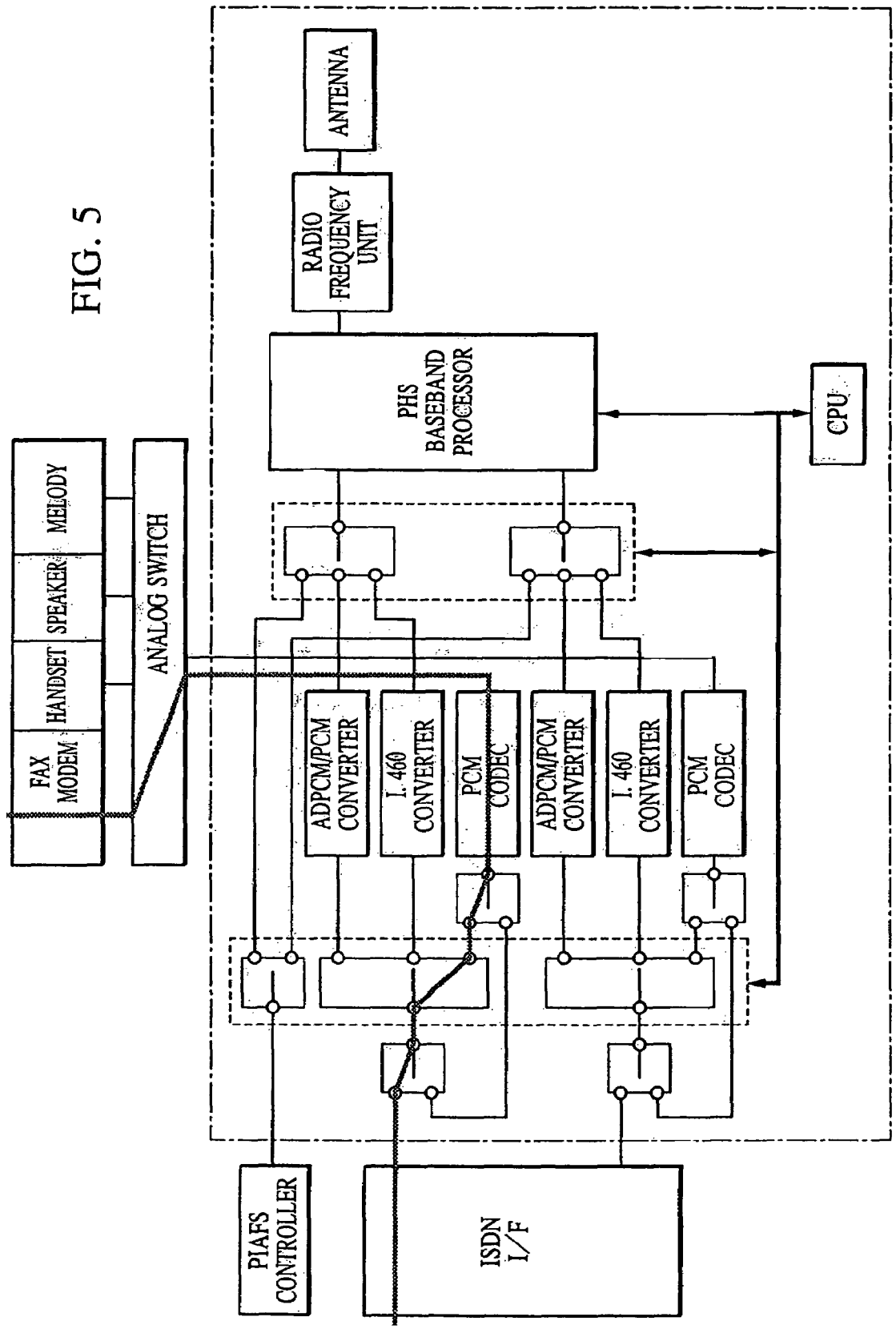
FIG. 5 is a flowchart showing a process for performing facsimile communication by the facsimile apparatus FS1 of the present embodiment when the facsimile apparatus FS1 is connected to the ISDN 101.

FIG. 5 shows a data stream when performing facsimile communication by the facsimile apparatus FS1 of the first embodiment when the facsimile apparatus FS1 is connected to the ISDN 101.

Figure 6:
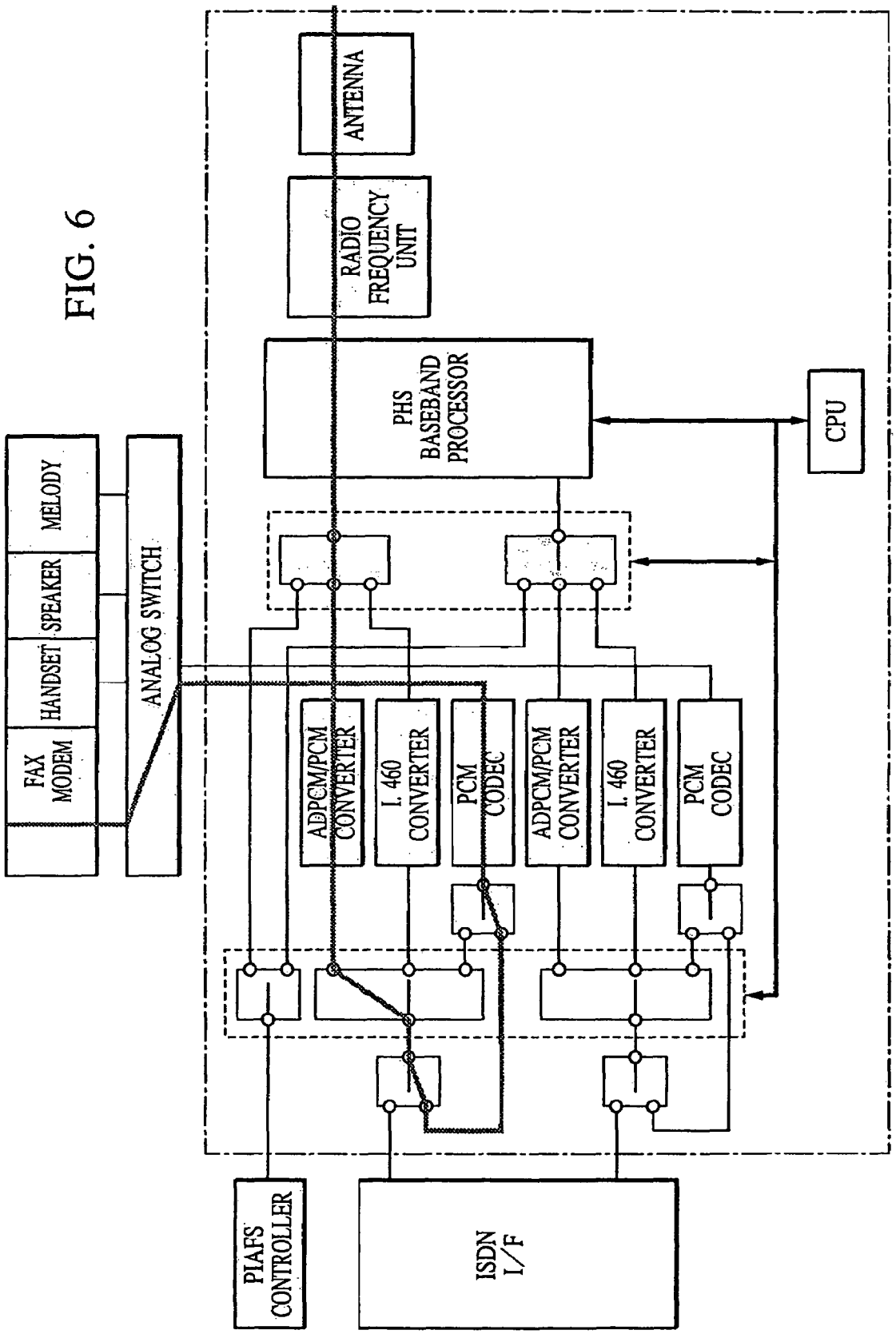
FIG. 6 is a flowchart showing a process for performing facsimile communication by the facsimile apparatus FS1 of the present embodiment when the facsimile apparatus FS1 is not connected to the ISDN 101.

FIG. 6 shows a data stream when performing facsimile communication by the facsimile apparatus FS1 of the first embodiment when the facsimile apparatus FS1 is not connected to the ISDN 101.

Figure 7:
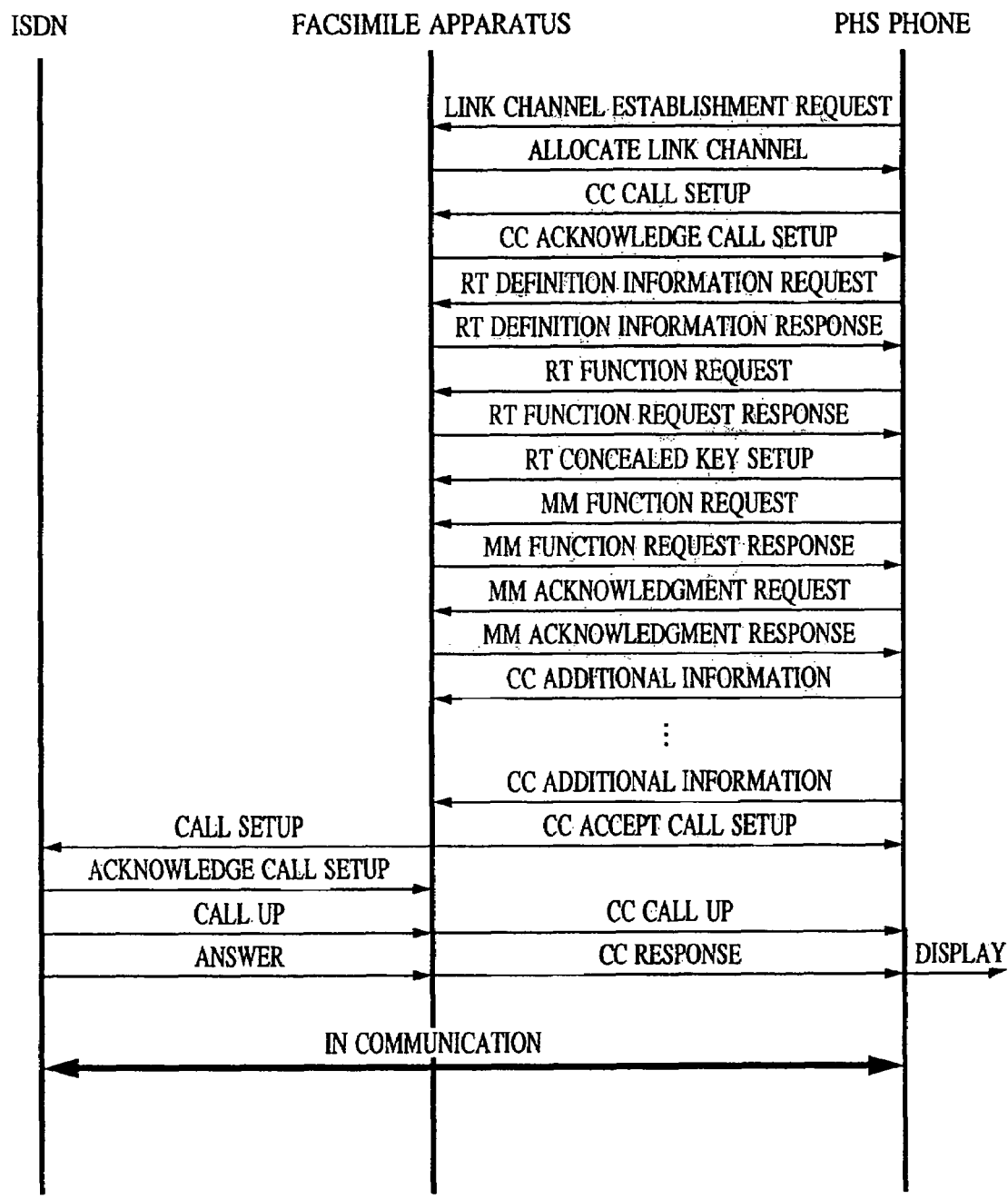
FIG. 7 is a sequence diagram of how the facsimile apparatus FS1 of the present embodiment places an outgoing call when the facsimile apparatus FS1 is connected to the ISDN 101.

FIG. 7 shows a sequence when making a call from the PHS 100 through the facsimile apparatus FS1 of the first embodiment while the facsimile apparatus FS1 is connected to the ISDN 101.

Figure 8:
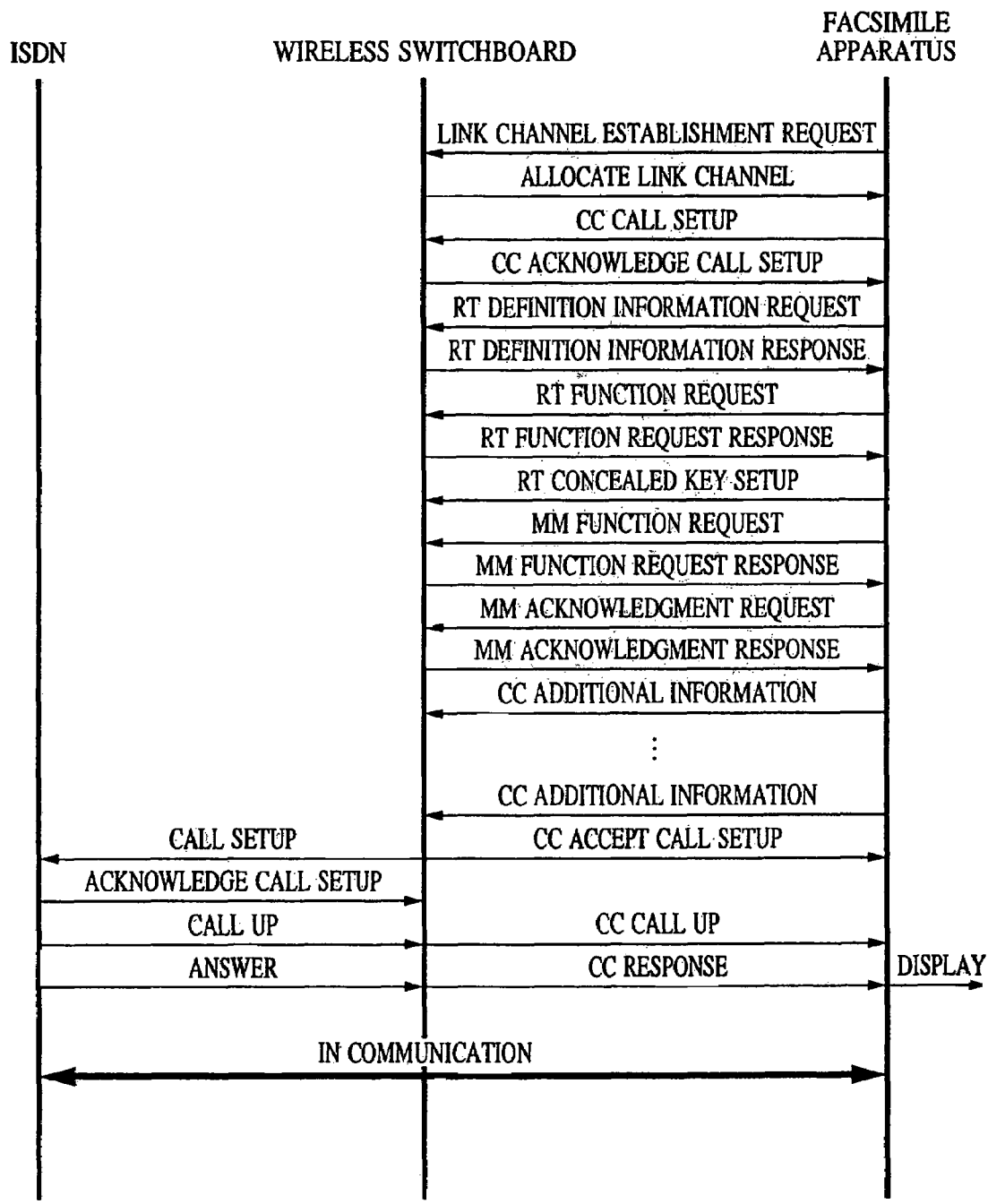
FIG. 8 is a sequence diagram of how the facsimile apparatus FS1 of the present embodiment places an outgoing call when the facsimile apparatus FS1 is not connected to the ISDN 101.

FIG. 8 shows a sequence when making a call from the facsimile apparatus FS1 of the first embodiment when the facsimile apparatus FS1 is not connected to the ISDN 101.

The operation in which the facsimile apparatus FS1 and the ISDN 101 are interconnected and the operation in which the facsimile apparatus FS1 is not connected to the ISDN 101 are described next.

FIGS. 9 and 10 are flowcharts showing control operations of the facsimile apparatus FS1 of the first embodiment.

Operation when facsimile apparatus FS1 is connected to ISDN 101 and functions as master station of PHS 100:

Immediately after turning on the facsimile apparatus FS1, the CPU 201 performs activation control of the layer 1 of the ISDN interface part 219. The ISDN interface part 219 transmits INFO1 signal (asynchronous signal) specified by the ITU-T Recommendations I.430 to the ISDN 101, and starts processing to establish synchronization (S601).

Upon entering a state in which predetermined INFO4 signal (synchronous response signal) from the ISDN 101 can be received, synchronization with the layer 1 is established. The ISDN interface part 219 interrupts the CPU 201, and the CPU 201 acknowledges the establishment of the layer 1 (S602).

Next, the CPU 201 that has acknowledged the establishment of the layer 1 starts processing to establish the layer 2. The CPU 201 assembles the link access procedure for the D-channel (LAPD) frames and transmit this to the ISDN 101 via the ISDN interface part 219 (S603). In response to a predetermined response from the ISDN 101, the CPU 201 enters a state in which information frames can be transmitted and received, and the layer 2 is established (S604). At this stage, the CPU 201 determines that connection has been made to the ISDN 101.

When the CPU 201 determines that connection has been made to the ISDN 101, it is determined that the facsimile apparatus FS1 operates as a master station of the PHS 100. The CPU 201 displays, on the display unit 236, "connected to ISDN 101", "operating as master station of PHS 100", and the like. The CPU 201 then instructs the CPU 301 of the PHS processor 222 to operate as a master station of the PHS 100 (S605).

In response to the instruction, the CPU 301 controls the switches 316 to 319 (S606). Specifically, the digital signal side of the PCM codecs 310 and 311 is connected to the ISDN 101 (signal lines 229 and 230). In other words, the switch 316 is switched to interconnect the switch 314 and the signal line 229. The switch 317 is switched to interconnect the switch 315 and the signal line 230. The switch 318 is switched to interconnect the switch 314 and the PCM codec 310. The switch 319 is switched to interconnect the switch 315 and the PCM codec 311.

The CPU 301 controls the clock selecting switch 322 to select a clock multiplied by the multiplier circuit 321 as a clock to be used for performing digital wireless communication (S607). Accordingly, data transmission and reception in network synchronization can be performed, and data underflow and overflow are prevented.

The digital wireless communication protocol processing starts up only a master station processing facility for the PHS 100 (S608).

The operation for making a call from the PHS 100 to the ISDN 101 through the facsimile apparatus FS1 and talking to a person connected through the ISDN 101 is described next.

When a call is dialed from the PHS 100, the PHS 100 performs outgoing call processing. The PHS 100 transmits a link channel establishment request to the facsimile apparatus FS1. From this time onward, the facsimile apparatus FS1 establishes a digital wireless link with the PHS 100 in accordance with the sequence shown in FIG. 7.

When the CPU 301 in the facsimile apparatus FS1 receives a call setup message and subsequent additional information from the PHS 100 (S609), the CPU 301 informs the CPU 201 of the received message and the information (S61.0). The CPU 201 instructs the ISDN interface part 219 to transmit the call setup message to the ISDN 101 (S611). In response to a response from the ISDN 101 (S612), the ISDN interface part 219 informs the CPU 201 of the reception of the response. The CPU, 201 informs the CPU 301 of the response. The CPU 301 transmits the response message to the PHS 100 (S613).

From this step onward, B-channel data can be transmitted and received between the facsimile apparatus FS1 and the destination terminal FS2 through the ISDN 101. Specifically, audio data transmitted from the PHS 100 is transmitted to the ISDN 101 by the facsimile apparatus FS1, whereas audio data received from the ISDN 101 is transmitted to the PHS 100 by the facsimile apparatus FS1.

FIG. 4 shows the data flow in the above example.

Specifically, audio data received from the PHS 100 through the antenna 305 and the radio frequency unit 304 is converted into a baseband digital signal by the PHS baseband processor 303. Under the control of the CPU 301, the switch 312 is configured to interconnect the PHS baseband processor 303 and the ADPCM/PCM converter 306. The ADPCM/PCM converter 306 converts the ADPCM audio data received from the PHS 100 into 64-Kbps PCM-coded data (S614), and the data is transferred to the ISDN 101 through the switches 314 and 316 (S615).

When the facsimile apparatus FS1 is operating as a master station of the PHS 100, and when a facsimile transmission request is made in the facsimile apparatus FS1 (S616), the CPU 206 informs the CPU 201 of the facsimile transmission request (S617). Under the control of the informed CPU 201 that has been informed of the request, a call setup message is transmitted to the ISDN 101 (S618). When a response message from the ISDN 101 is received (S619), the analog switch 216 is switched (S620), and the CPU 206 is instructed to start performing facsimile transmission.

In response to the instruction, the CPU 206 causes the color printer/color scanner 210 to read image data. The read image data is compressed, and the compressed data is modulated by the facsimile modem 212 (S621). The modulated analog signal is input to the PCM codec 310 via the analog switch 216, and the PCM codec 310 performs PCM code conversion of the signal (S622). The PCM-coded data is input to the ISDN 101 through the switches 318, 314, and 316 (S623).

FIG. 5 shows the data flow in the above example. Operation when facsimile apparatus FS1 is not connected to ISDN 101 and functions as remote station of wireless switchboard RC1:

In contrast, in step S602, when the layer 1 is not established within a predetermined period of time, the ISDN interface part 219 interrupts the CPU 201, and the CPU 201 determines that no connection has been made to the ISDN 101. When the CPU 201 determines that no connection has been made to the ISDN 101, the CPU 201 displays, on the display unit 236, "not connected to ISDN 101", "operating as remote station of wireless switchboard RC1" and the like. At the same time, the CPU 201 instructs the PHS processor 222 that the facsimile apparatus FS1 should operate as a remote station digital wireless facsimile apparatus.

When the layer 2 is not established in step S604, the CPU 201 determines that no connection has been made to the ISDN 101, and displays the same messages.

Referring to FIG. 10, the CPU 201 displays, on the display unit 236, "not connected to ISDN 101". "operating as remote station of wireless switchboard RC1", and the like. The CPU 201 instructs the CPU 301 of the PHS processor 222 that the facsimile apparatus FS1 should operate as a remote station of the wireless switchboard RC1 (S624).

In response to the instruction, the CPU 301 controls the switches 316 to 319 (S625). Specifically, the digital signal side of the PCM codec 310 is connected to the ADPCM/PCM converter 306 via the switches 318, 316, and 314. Also, the digital signal side of the PCM codec 311 is connected to the ADPCM/PCM converter 307 via the switches 319, 317, and 315.

The CPU 301 controls the clock selecting switch 322 to select the clock generated by the TCXO 320 as the clock used for performing digital wireless communication (S626). The reason for this is as follows. Since the degree of accuracy is low of a free-running frequency of the digital PLL 235 that extracts the clock from the ISDN 101, the frequency accuracy required for performing digital wireless communication cannot be obtained when the ISDN 101 is not connected.

Even when the ISDN 101 is not connected, provision of a highly accurate digital PLL in the ISDN interface part 219 enables the free-running clock of the digital PLL to be used as a digital wireless communication clock.

The digital wireless communication protocol processing starts up only a remote station processing facility for the wireless switchboard RC1 (S627).

Next, the operation for performing facsimile transmission by the facsimile apparatus FS1 as a remote station of the wireless switchboard RC1 is described.

When a facsimile transmission request is input from the operation panel 211 (S628), the CPU 206 recognizes the input dial information and informs the CPU 201 of the facsimile transmission request and the dial information (S629). The CPU 201 instructs the CPU 301 of the PHS processor 222 to perform facsimile transmission, and the CPU 301 starts processing to establish a wireless link for the facsimile transmission (S630).

Specifically, the facsimile apparatus FS1 transmits a link channel establishment request to the wireless switchboard RC1. From this step onward, the facsimile apparatus FS1 establishes a digital wireless link with the wireless switchboard RC1 and transmits a transmission request to the wireless switchboard RC1 in accordance with the sequence shown in FIG. 8.

When a response message in response to the facsimile transmission request is received from the wireless switchboard RC1 (S631), the facsimile apparatus FS1 enters a state in which connection has been made to the ISDN 101 through the digital wireless link and the wireless switchboard RC1. The CPU 301 informs the CPU 201 of the response, and the CPU 201 switches the analog switch 216 (S632). Subsequently, the CPU 206 is instructed to start the facsimile transmission (S633). In response to the instruction, the CPU 206 activates the color printer/color scanner 210 to read image data. The read image data is compressed, and the compressed data is input to the facsimile modem 212 (S634).

The facsimile modem 212 modulates the input data into an analog signal, and the converted analog signal is input to the analog switch 216. Since the analog switch 216 is connected to the PCM codec 310, the analog signal input from the analog switch 216 to the PCM codec 310 is converted to 64-Kbps PCM-coded data (S635), and the converted data is input to the ADPCM/PCM converter 306 via the switches 318, 316, and 314. The input signal is converted from the 64-Kbps PCM data into 32-Kbps ADPCM data (S636) and is input to the PHS baseband processor 303 via the switch 312.

The signal input to the PHS baseband processor 303 is assembled into a PHS transmission frame by the PHS baseband processor 303 (S637). Subsequently, the radio frequency unit 304 modulates the PHS transmission frame, and the modulated frame is transmitted to the wireless switchboard RC1. The wireless switchboard RC1 transmits the frame to the ISDN 101 (S638).

The facsimile transmission is as described above.

Next, the operation of audio communication using the handset 213 is described.

In response to an outgoing call request from the handset (S639), the CPU 206 informs the CPU 201 of the outgoing call request (S640). In response to the request, the CPU 201 instructs the CPU 301 to place the outgoing call by establishing a digital wireless link and by instructing the wireless switchboard RC1 to transfer the call (S641). When a response from the wireless switchboard RC1 is made in response to the outgoing call request (S642), the CPU 201 switches the analog switch 216 (S643). The CPU 201 causes an analog audio signal input from the handset 213 to be input to the PCM codec 310 (S644). The processing from this step onward is the same as the processing from step S635 onward when performing the facsimile transmission.

As described above, the data bus and the wireless protocol processing are switched depending on whether the facsimile apparatus FS1 is connected to the ISDN 101. This enables the facsimile apparatus FS1 to be automatically switched between operating as a master station of the PHS 100 and a remote station of the wireless switchboard RC1.

According to the first embodiment, the most appropriate communication mode is automatically set in accordance with the location at which the facsimile apparatus FS1 is used.

According to the first embodiment, provision of the TCXO 320 for generating a clock to be used for performing intercommunication between the facsimile apparatus FS1 and the wireless switchboard RC1 enables the facsimile apparatus FS1 to perform digital wireless communication at a predetermined frequency with predetermined accuracy even when operating as a master station of the PHS 100 or a remote station of the wireless switchboard RC1.

According to the first embodiment, when the facsimile apparatus FS1 is connected to the ISDN 101, the master station digital wireless communication protocol for the PHS 100 is selected. When the facsimile apparatus FS1 is not connected to the ISDN 101, the remote station digital wireless communication protocol for the wireless switchboard RC1 is selected. Hence, the operation of the facsimile apparatus FS1 between the master station operation and the remote station operation is switched only by software control.

According to the first embodiment, the connection state of the facsimile apparatus FS1 to the ISDN 101 is displayed, enabling a user to clearly understand the communication state of the facsimile apparatus FS1.

According to the first embodiment, provision of the switches 316 and 317, which are inserted between the ADPCM/PCM converters 306 and 307 and the ISDN 101, and the switches 318 and 319, which are inserted between the ADPCM/PCM converters 306 and 307 and the PCM codecs 310 and 311, enables the facsimile apparatus FS1 to use the same circuit when operating as a master station of the PHS 100 and a remote station of the wireless switchboard RC1.

Second Embodiment

In the first embodiment, the facsimile apparatus FS1 determines the state of the connection with the ISDN 101 only when the facsimile apparatus FS1 is turned on. According to a second embodiment of the present invention, the facsimile apparatus FS1 continuously or periodically determines the state of the connection with the ISDN 101.

If the state of the connection with the ISDN 101 changes, the PHS processor 222 is initialized, and the communication setting is performed in accordance with the state of the connection.

According to the second embodiment, when the state of the connection of the facsimile apparatus FS1 with the ISDN 101 changes after the facsimile apparatus FS1 has been turned on, the facsimile apparatus FS1 can be continuously used without first turning off and again turning on the facsimile apparatus FS1.

Third Embodiment

In the first embodiment, the facsimile apparatus FS1 has the PHS processor 222 including therein the TCXO 320 and the multiplier circuit 321. In accordance with the communication mode, one of the 19.2 MHz clocks generated by the TCXO 320 and the multiplier circuit 321 is selected to be used for performing communication. According to a third embodiment of the present invention, the TCXO 320 and the multiplier circuit 321 are provided in a region other than that specified in the first embodiment. For example, a digital PLL in an ISDN interface part is operated by a TCXO with a high frequency accuracy, and a clock supplied from the ISDN interface part is always used in a PHS processor.

Fourth Embodiment

In the first embodiment, the PHS system is used as the wireless link system, and the ISDN is used as the wired communication line. According to a fourth embodiment of the present invention, other wireless communication systems such as the Digital European Cordless Telephone (DECT) system, the Cordless Telephony Generation 2 (CT2) for England, or the Cordless Telephony Generation 3 (CT3) for Sweden, the Universal Digital Portable Communications (UDPC), or cellular phone systems such as the Personal Digital Cellular (PDC) system, the Global System for Mobile Communications (GSM), the Code Division Multiple Access (CDMA)-One, or the International Mobile Telecommunication 2000 (IMT2000) can be used. Also other wired communication lines such as analog public lines or other digital lines can be used.

In the case of using an analog public line as the wired communication line, the state of the connection with the analog public line is determined by whether the value of the current flowing when the loop is closed is equal to or greater than a predetermined value.

When the analog public line is used as the wired communication line, the digital wireless communication processing is not required to operate in synchronism with the analog public communication line. Therefore, the multiplier circuit 321 and the clock selecting switch 322 in the PHS processor 222 become unnecessary.

According to the fourth embodiment, when the analog public line is used as the wired communication line, the same advantages as in the first embodiment can be achieved without provision of the multiplier circuit 321 and the clock selecting switch 322 in the PHS processor 222.

Although the facsimile apparatus is described by way of example in the above embodiments, the present invention can be applied to a communication apparatus such as a telephone or a personal computer having a wired communication function and a wireless communication function.

According to the present invention, the most appropriate communication mode is automatically set in accordance with the location at which a communication apparatus having a wired communication function and a wireless communication function is used. In addition, various advantages as described in the embodiments can be achieved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus comprising:
    a communication unit having a base station mode for controlling wireless communication of a slave station and a slave station mode for wirelessly communicating under the control of a base station;
    a determining unit adapted to determine whether a wired communication line is connected to said communication apparatus; and
    a switching unit adapted to switch between the base station mode and the slave station mode in accordance with the determination by said determining unit,
    wherein said communication unit relays data from the slave station to the wired communication line and transmits data inputted in said communication apparatus by a user to the wired communication line when operating in the base station mode, and transmits the data inputted by the user to the base station, which relays the data to the wired communication line, when operating in the slave station mode.

2. A communication apparatus according to claim 1, wherein said determining unit performs the determination based on whether synchronization with one of layer 1 and layer 2 of the wired communication line can be established.

3. A communication apparatus according to claim 1, further comprising:
    a generating unit adapted to generate a clock for performing communication through a wireless communication line, and
    a control unit adapted to control, in accordance with the determination by said determining unit, to perform one of communication in accordance with a clock extracted from the wired communication line and communication in accordance with the clock generated by said generating unit.

4. A communication apparatus according to claim 1, wherein said determining unit performs the determination when power is supplied to said communication apparatus.

5. A communication apparatus according to claim 1, wherein said determining unit continuously performs the determination.

6. A communication apparatus according to claim 1, wherein said determining unit periodically performs the determination.

7. A communication apparatus according to claim 1, further comprising:
    a display unit adapted to display in accordance with the determination by said determining unit.

8. A communication apparatus according to claim 1, further comprising:
    a display unit adapted to display whether to perform one of the communication in the base station mode and the communication in the slave station mode.

9. A communication apparatus according to claim 1, wherein a converting unit adapted to convert, in accordance with the switched mode, a received digital signal into one of a digital signal using another encoding system and an analog signal.

10. A communication apparatus according to claim 1, wherein said communication apparatus performs digital wireless communication and digital wired communication.

11. A method for controlling a communication apparatus having a communication unit having a base station mode for controlling wireless communication of a slave station and a slave station mode for wirelessly communicating under the control of a base station, said method comprising the steps of:
    determining whether a wired communication line is connected to the communication apparatus; and
    switching between the base station mode and the slave station mode in accordance with the determination in said determining step,
    wherein said communication unit relays data from the slave station to the wired communication line and transmits data inputted in said communication apparatus by a user to the wired communication line when operating in the base station mode, and transmits the data inputted by the user to the base station, which relays the data to the wired communication line, when operating in the slave station mode.

* * * * *

UNITED STATES PATENT AND TRADEMARK OFFICE
CERTIFICATE OF CORRECTION

| | | |
|---|---|---|
| PATENT NO. | : 7,408,438 B2 | Page 1 of 1 |
| APPLICATION NO. | : 11/124235 | |
| DATED | : August 5, 2008 | |
| INVENTOR(S) | : Michihiro Izumi | |

It is certified that error appears in the above-identified patent and that said Letters Patent is hereby corrected as shown below:

ON COVER PAGE AT (30) FOREIGN APPLICATION PRIORITY DATA

"Dec. 20, 1999  (JP)  ....... 1999-360343" should read
      --Dec. 20, 1999  (JP)  ....... 11-36034--.

COLUMN 2

Line 4, "liners" should read --line,--.

COLUMN 5

Line 15, "connected" should read --is connected--; and
    Line 43, "in putting" should read --inputting--.

COLUMN 7

Line 18, "information (S61.0)." should read --information (S610).--; and
    Line 23, "The CPU, 201" should read --The CPU 201--.

COLUMN 8

Line 12, "101". "operating" should read --101", "operating--.

Signed and Sealed this

Sixth Day of January, 2009

JON W. DUDAS
*Director of the United States Patent and Trademark Office*